(12) United States Patent
Kienzle et al.

(10) Patent No.: US 8,797,207 B2
(45) Date of Patent: Aug. 5, 2014

(54) FILLING LEVEL MEASURING DEVICE ANTENNA COVER

(75) Inventors: Klaus Kienzle, Zell am Harmersbach (DE); Christian Sum, Wolfach (DE); Thomas Kopp, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 332 days.

(21) Appl. No.: 13/088,889

(22) Filed: Apr. 18, 2011

(65) Prior Publication Data

US 2012/0262331 A1  Oct. 18, 2012

(51) Int. Cl.
| | | |
|---|---|---|
| *G01S 13/08* | (2006.01) |
| *H01Q 19/06* | (2006.01) |
| *H01Q 13/00* | (2006.01) |
| *H01Q 15/02* | (2006.01) |
| *H01Q 15/08* | (2006.01) |
| *B29C 45/26* | (2006.01) |
| *H01Q 13/02* | (2006.01) |
| *H01Q 1/22* | (2006.01) |
| *G01F 23/284* | (2006.01) |
| *H01Q 19/08* | (2006.01) |
| *G01S 7/02* | (2006.01) |

(52) U.S. Cl.
CPC ............ *B29C 45/2624* (2013.01); *H01Q 13/02* (2013.01); *G01S 2007/027* (2013.01); *H01Q 1/225* (2013.01); *G01F 23/284* (2013.01); *H01Q 19/08* (2013.01)
USPC ........ 342/124; 343/753; 343/772; 343/781 R; 343/909; 343/911 R; 343/911 L (58) Field of Classification Search
USPC .................. 342/124; 343/753–755, 772, 778, 343/781 R, 786, 907, 909, 910, 911 R, 911 L
See application file for complete search history.

(56) References Cited

U.S. PATENT DOCUMENTS

| | | | | | |
|---|---|---|---|---|---|
| 3,935,577 | A | * | 1/1976 | Hansen .................... 343/781 R |
| 3,936,835 | A | * | 2/1976 | Phelan ......................... 343/753 |
| 4,179,699 | A | * | 12/1979 | Lunden ........................ 343/872 |
| 4,220,957 | A | * | 9/1980 | Britt ............................. 343/756 |
| 4,769,646 | A | * | 9/1988 | Raber et al. .................. 343/753 |
| 4,788,553 | A | * | 11/1988 | Phillips ........................ 343/786 |
| 4,804,970 | A | * | 2/1989 | Todd ............................ 343/753 |

(Continued)

FOREIGN PATENT DOCUMENTS

| | | |
|---|---|---|
| DE | 10 2005 056 042 | 5/2007 |
| DE | 10 2006 030 965 | 5/2007 |

(Continued)

OTHER PUBLICATIONS

"Bessere Dome bauen", protomold, Design-Tipp Aug. 2013, http://www.protomold.de/design_tips/germany/2013/2013-08_designtips/default.htm, Translation retrieved Dec. 19, 2013.*

(Continued)

*Primary Examiner* — Peter Bythrow
(74) *Attorney, Agent, or Firm* — Fay Kaplun & Marcin, LLP (57) ABSTRACT

A filling level measuring device antenna cover includes a base body and a plurality of circular fins concentrically arranged on the base body, wherein the fins and the base body consist of a plastic material. The fins and the base body are one piece and injection-moulded.

12 Claims, 6 Drawing Sheets

(56) References Cited

U.S. PATENT DOCUMENTS

| | | | |
|---|---|---|---|
| 4,980,696 A * | 12/1990 | Stone et al. | 343/872 |
| 5,214,394 A * | 5/1993 | Wong | 330/286 |
| 5,486,950 A * | 1/1996 | Collinge | 359/565 |
| 5,606,334 A * | 2/1997 | Amarillas et al. | 343/840 |
| 5,675,349 A * | 10/1997 | Wong | 343/910 |
| 5,731,777 A * | 3/1998 | Reynolds | 342/4 |
| 5,935,190 A * | 8/1999 | Davis et al. | 701/119 |
| 5,991,474 A * | 11/1999 | Baldi | 385/15 |
| 6,281,852 B1 * | 8/2001 | Amarillas | 343/725 |
| 6,281,853 B1 * | 8/2001 | Caille et al. | 343/754 |
| 6,313,802 B1 * | 11/2001 | Petersson | 343/753 |
| 6,473,049 B2 * | 10/2002 | Takeuchi et al. | 343/753 |
| 6,614,391 B1 * | 9/2003 | Burger et al. | 342/124 |
| 6,891,513 B2 * | 5/2005 | Kienzle et al. | 343/786 |
| 6,928,867 B2 * | 8/2005 | Reimelt et al. | 73/290 V |
| 6,950,073 B2 * | 9/2005 | Clymer et al. | 343/713 |
| 7,075,480 B2 * | 7/2006 | Fehrenbach et al. | 342/124 |
| 7,075,496 B2 * | 7/2006 | Hidai et al. | 343/786 |
| 7,355,560 B2 * | 4/2008 | Nagai | 343/911 R |
| 7,474,271 B2 * | 1/2009 | Nagano et al. | 343/786 |
| 7,515,095 B2 * | 4/2009 | Wilkie et al. | 342/124 |
| 7,755,557 B2 * | 7/2010 | McGonigle et al. | 343/786 |
| 7,864,104 B2 * | 1/2011 | Chen et al. | 342/124 |
| 7,872,610 B2 * | 1/2011 | Motzer et al. | 343/785 |
| 8,040,274 B2 * | 10/2011 | Wendler et al. | 342/124 |
| 8,350,751 B2 * | 1/2013 | Edvardsson et al. | 342/124 |
| 2002/0101390 A1 * | 8/2002 | Takeuchi et al. | 343/910 |
| 2003/0016539 A1 * | 1/2003 | Minano et al. | 362/347 |
| 2003/0222828 A1 * | 12/2003 | Suga | 343/786 |
| 2004/0227686 A1 * | 11/2004 | Sasaki et al. | 343/786 |
| 2005/0062664 A1 * | 3/2005 | Hidai et al. | 343/786 |
| 2006/0071876 A1 * | 4/2006 | Clymer et al. | 343/911 R |
| 2006/0202909 A1 * | 9/2006 | Nagai | 343/911 R |
| 2007/0115196 A1 | 5/2007 | Motzer et al. | |
| 2009/0058749 A1 * | 3/2009 | Shimoi et al. | 343/786 |
| 2009/0109111 A1 * | 4/2009 | McGonigle et al. | 343/786 |
| 2009/0212996 A1 * | 8/2009 | Chen et al. | 342/124 |
| 2010/0066594 A1 * | 3/2010 | Kienzle et al. | 342/175 |
| 2010/0090883 A1 * | 4/2010 | Chen et al. | 342/124 |
| 2011/0205136 A1 * | 8/2011 | Runyon et al. | 343/786 |
| 2011/0221629 A1 * | 9/2011 | Edvardsson et al. | 342/124 |
| 2012/0169527 A1 * | 7/2012 | Edvardsson | 342/124 |

FOREIGN PATENT DOCUMENTS

| | | |
|---|---|---|
| EP | 2 031 700 | 8/2008 |
| JP | 59 022403 | 4/1984 |
| WO | 02/41446 | 5/2002 |
| WO | 02/50954 | 6/2002 |
| WO | 2008/037302 | 4/2008 |

OTHER PUBLICATIONS

Du et al., "Microwave lens design for a conical horn antenna," Microwave Journal, Sep. 1976, pp. 49-52, XP-002201814.

* cited by examiner

FILLING LEVEL MEASURING DEVICE ANTENNA COVER

FIELD OF THE INVENTION

The present invention relates to filling level measuring. In particular, the present invention relates to a filling level measuring device antenna cover of a filling level measuring device, an antenna of a filling level measuring device comprising a cover, a filling level measuring device and a method of producing a filling level measuring device antenna cover.

TECHNOLOGICAL BACKGROUND

Known filling level measuring devices comprise parabolic antennas or horn antennas that transmit or receive radar waves or microwaves in order to determine the filling level of a medium in a filling level container. The antenna of such a filling level measuring device is, for example, arranged within the container.

For maximizing the antenna gain, the length of the antenna may be adjusted according to the frequency of the electromagnetic transmission signal used.

If the length of the antenna is reduced (without increasing the frequency of the transmit signal and without changing the aperture of the antenna), the antenna gain usually decreases and the intensity of secondary lobes increase.

In order to increase the antenna gain, a convex lens may be positioned at the end of the antenna horn, which lens may consist of a dielectric material. Such a lens changes the relative phase between microwaves which cross the lens in its outer region and microwaves which cross the lens in its centre, thus resulting in a phase correction between the two parts of the transmission signal, which in turn results in a more or less planar phase front of the transmission signal after it has left the antenna and the lens.

Such lenses are produced from an unmachined part by milling or lathing.

SUMMARY OF THE INVENTION

The present invention relates to an antenna cover which can be produced at low costs.

According to a first aspect of the present invention a filling level measuring device antenna cover for covering an antenna of a filling level measuring device is provided, wherein the cover comprises a base body and a plurality of circular fins which are concentrically arranged on the base body. Both the plurality of circular fins and the base body consist of a plastic material and may be integrally formed, i.e. in one piece.

According to another aspect of the invention, an antenna of a filling level measuring device is provided, which comprises the above and below described filling level measuring device antenna cover.

According to another aspect of the invention, a filling level measuring device is provided, which comprises the above and below described antenna.

According to another aspect of the invention, a method of producing the above and below described filling level measuring device antenna cover is provided in which the cover is injection-moulded.

By providing a base body with a plurality of circular fins concentrically arranged thereon, the whole antenna cover can be moulded in one single piece, without the need for milling or lathing steps. Thus, the costs for producing the cover may be significantly reduced.

The antenna cover may be adapted for focusing electromagnetic radiation emitted by the antenna, i.e. the transmission signal. In other words, the antenna cover may not only be used for covering, i.e. sealing, one end of the antenna but also as a lens which focuses the transmission signal and increases the antenna gain.

According to another exemplary embodiment of the present invention, the antenna cover is adapted as a lens that has at least one of a convex surface and a concave surface. For example, the surface which faces the filling medium inside the container, i.e. the outer surface of the antenna cover, may be convex or concave.

According to another exemplary embodiment of the present invention, at least one of the fins has a constant thickness. The term "thickness" refers to the distance between opposite surfaces of the fin. In other words, the fin (or each of the fins) has the shape of a hollow cylinder.

According to another exemplary embodiment of the present invention, the base body has a constant thickness. Again, the thickness of the base body corresponds to the distance between the two opposite, inner and outer surfaces of the base body.

In other words, the cover may comprise a plurality of sections, wherein each section has a constant thickness. This may improve the quality of the cover in case it is produced by injection moulding or die casting.

One advantage of having fins and base body sections which each have a constant thickness and wherein the thicknesses of the sections are identical or do not differ more than, let's say, by 60% or 70%, is that all sections of the cover need more or less the same time for solidifying during (or after) the moulding process.

According to another exemplary embodiment of the present invention, two adjacent fins of the plurality of fins have the same thickness, wherein a distance between the two adjacent fins is equal to the thickness of each of the two adjacent fins.

In other words, two or more or even all of the fins have the same thickness and are concentrically arranged with respect to each other, wherein the distance between each fin and its neighbour(s) corresponds to its thickness.

According to another exemplary embodiment of the present invention, the thickness of each of the fins is between 60% and 80%, and in particular 70% of the thickness of the base body.

According to another exemplary embodiment of the present invention the cover further comprises a dome arranged in a centre of the plurality of fins, i.e. in the centre of the cover. This dome may be the place where the material the cover consists of is injected into the mould.

Furthermore, according to another exemplary embodiment of the present invention, the cover has a conical shape. This means that, if the areas between the concentrically arranged fins would be filled with a material, the cross-section of the (filled) antenna cover has approximately the shape of a triangle.

According to another exemplary embodiment of the present invention, the base body and the plurality of circular fins are injection-moulded in one piece.

A great variety of different materials may be used for forming the base body and the fin, for example plastic materials with a dielectric constant bigger than that of vacuum. For example perfluoroalkoxy (PFA), polyvinylidene fluoride (PVDF), polyoxymethylene (POM), poly(p-phenylene sulfide) (PPS), polypropylene (PP) or polytetrafluoroethylene (PTFE) may be used.

According to a further exemplary embodiment of the present invention, the frequency of the transmission signal is between 1 GHz and 100 GHz, between 24 GHz and 27 GHz, in particular 25.3 GHz or between 50 GHz and 100 GHz, in particular between 75 GHz and 85 GHz.

Of course the cover may also be dimensioned such that it can be used with an antenna designed for frequencies higher than 100 GHz.

The cover may, for example, be a lens of an aspherical or a spherical design. In particular, the cover may be a biconvex, plan-convex or a concave-convex lens.

Below, exemplary embodiments of the present invention are described with reference to the drawings.

DETAILED DESCRIPTION OF EMBODIMENTS

The illustration in the drawings is schematically. In different drawings, similar or identical elements are provided with the same reference numerals.

Figure 1:
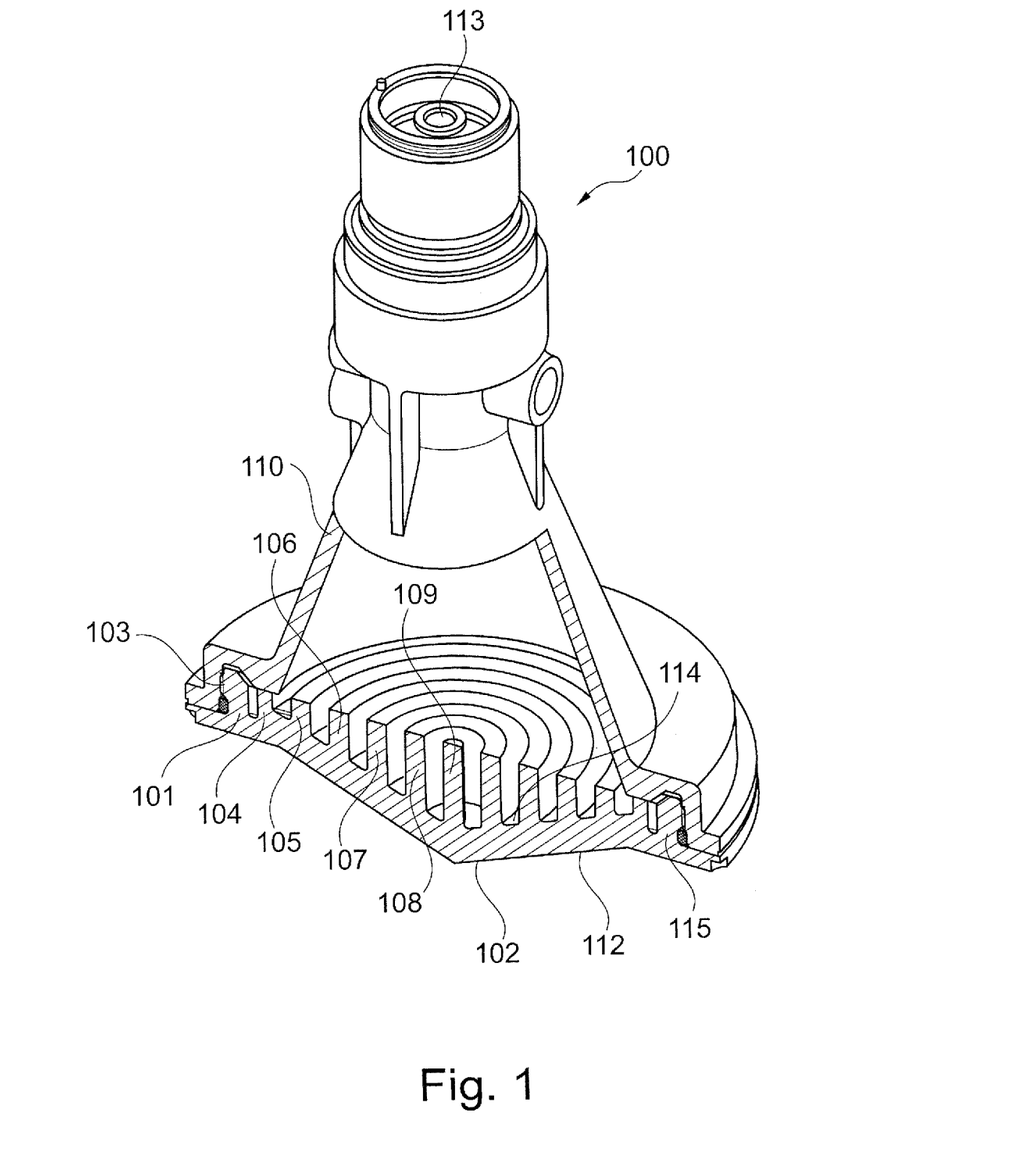
FIG. 1 shows a cross-sectional view of an antenna according to an exemplary embodiment of the present invention.

FIG. 1 shows a three-dimensional cross-sectional view of an antenna of a filling level measuring device according to an exemplary embodiment of the present invention. The antenna 100 is a horn antenna for a filling level radar and comprises an antenna horn 110 into which a transmission signal is fed from the top. Between the signal feed line 113, which is arranged at the top of the antenna 100 and the antenna horn 110 an optional cone-like element is disposed for improving the signal quality by reducing so called antenna ringing ("Antennenklingeln") or other unwanted oscillations.

At the open end of the antenna horn, which faces in the direction of the filling medium when the antenna is arranged in or at a container, an antenna cover 101 is attached.

The antenna cover 101 comprises a base body 102 which has an outer surface 112 facing in the direction of the filling medium, i.e. away from the antenna, and an inner surface 114, which faces away from the filling medium towards the inside of the antenna 100 in particular towards the feed line 113. On the upper, inner surface 114 of the base body 103 a plurality of circular fins 103, 104, 105, 106, 107, 108 and a central dome 109 are arranged. The base body 102, the plurality of circular fins 103-108 and the dome 109 form one single part and are fabricated by injection moulding or die casting, for example.

The antenna cover 101 is attached to the antenna horn 110 and a sealing ring 115 is provided therebetween in order to provide a tight seal between the antenna horn and the cover. The cover is mounted to the antenna horn by a threading, for example, which may be positioned above the sealing 115. Alternatively, the cover is mounted to the antenna horn by several bolts or screws, for example eight screws, at a region outside the sealing 115.

The shape and dimensions of the antenna cover are designed such that the cover can be injection-moulded. For example, thickness of the cover does not vary a lot. In particular, the fins 105-108 and the dome 109 all have the same thickness. The outer fins 103, 104 which are used for attaching cover to the antenna horn, for sealing the cover and the antenna horn and/or for supporting or strutting the antenna cover with respect to the antenna horn may have a different thickness. The thickness and dimensions of the outer parts is less important, since they do not influence the high frequency properties of the cover significantly.

It should be noted that the upper surface 114 and the lower surface 112 of the base body 102 are parallel with respect to each other and that the fins 104-108 have the shape of hollow cylinders.

For example, the thickness of each of the fins 105-108 is 0.7 times the thickness of the base body 102, or less. This may assure that the material used for molding the cover solidifies at every region at basically the same time.

Furthermore, the room between two adjacent fins is for example 2 mm in width or even wider. The cover material is for example injected at the top of the central dome 109.

When designing the antenna cover such that it can be injection-moulded, also microwave-related criteria have to be observed in order to assure an appropriate optical function of the cover, i.e. the lens. An appropriate design may be developed with the help of three-dimensional field simulations and examples of such a design are depicted in the drawings.

For example, the width of the fins 105-108 are approximately half the wavelength of the transmit signal inside the plastic material. If a frequency of the transmit signal of 26 GHz is used and polypropylene is used as plastic material for injection moulding the cover, the width of each fin is approximately 4 mm, considering a dielectric constant of approximately 2,2.

Exemplary embodiments of the cover may depart from the thickness of $\lambda/2$ by 10-15%. Departing from the $\lambda/2$ thickness may result in a lower antenna gain and in a decrease of the quality of the emission characteristics of the antenna.

The thickness S of the base body 102 may be 10/7 of the thickness of the fins T. Therefore, for the above example the thickness of the base body may be around 5,7 mm.

The distance between two adjacent fins may be the same as the thickness T of the fins, i.e. 4 mm.

Figure 2:
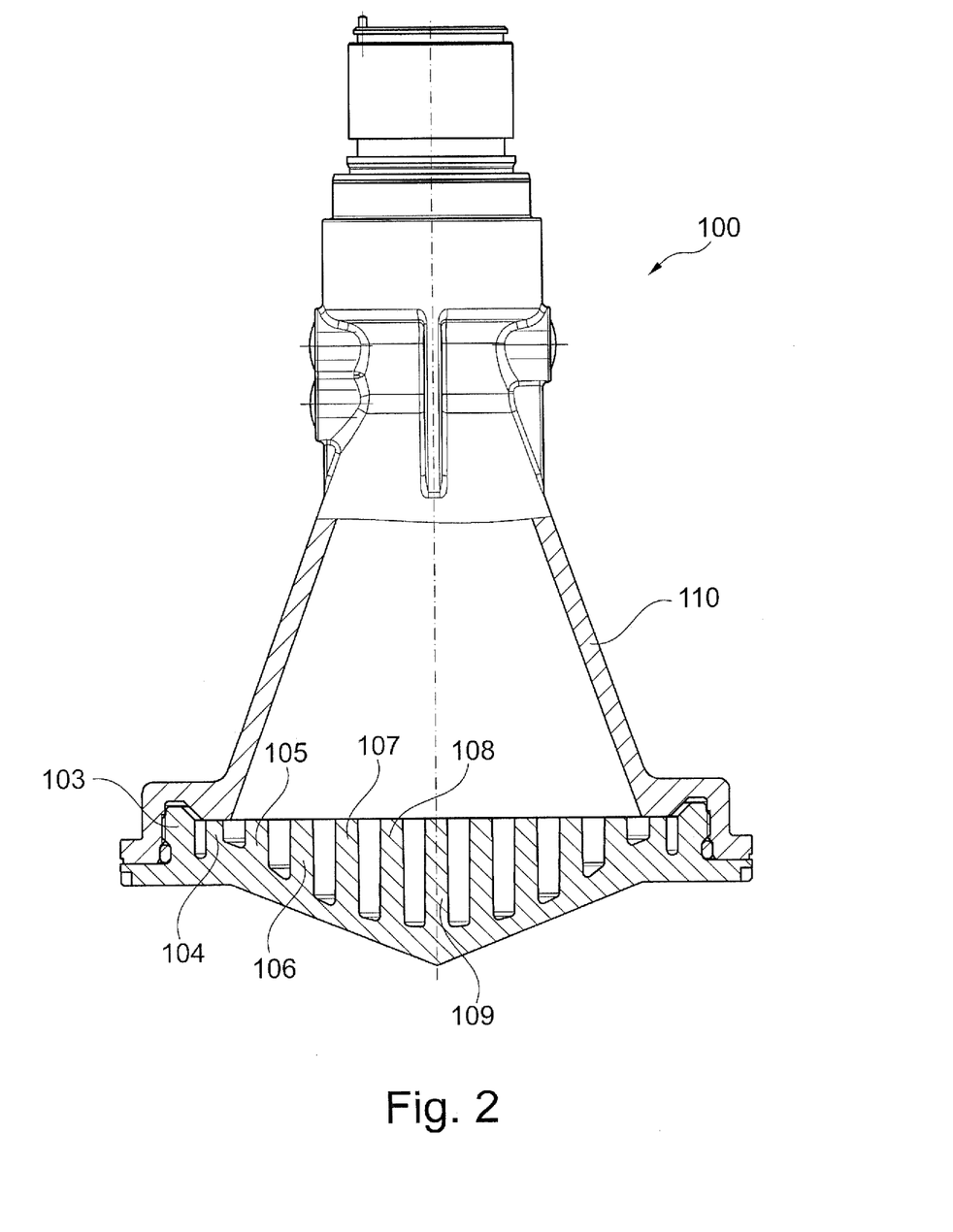
FIG. 2 shows a further cross-sectional view of the antenna of FIG. 1.

FIG. 2 shows another cross-sectional view of the antenna 100 of FIG. 1.

Figure 3:
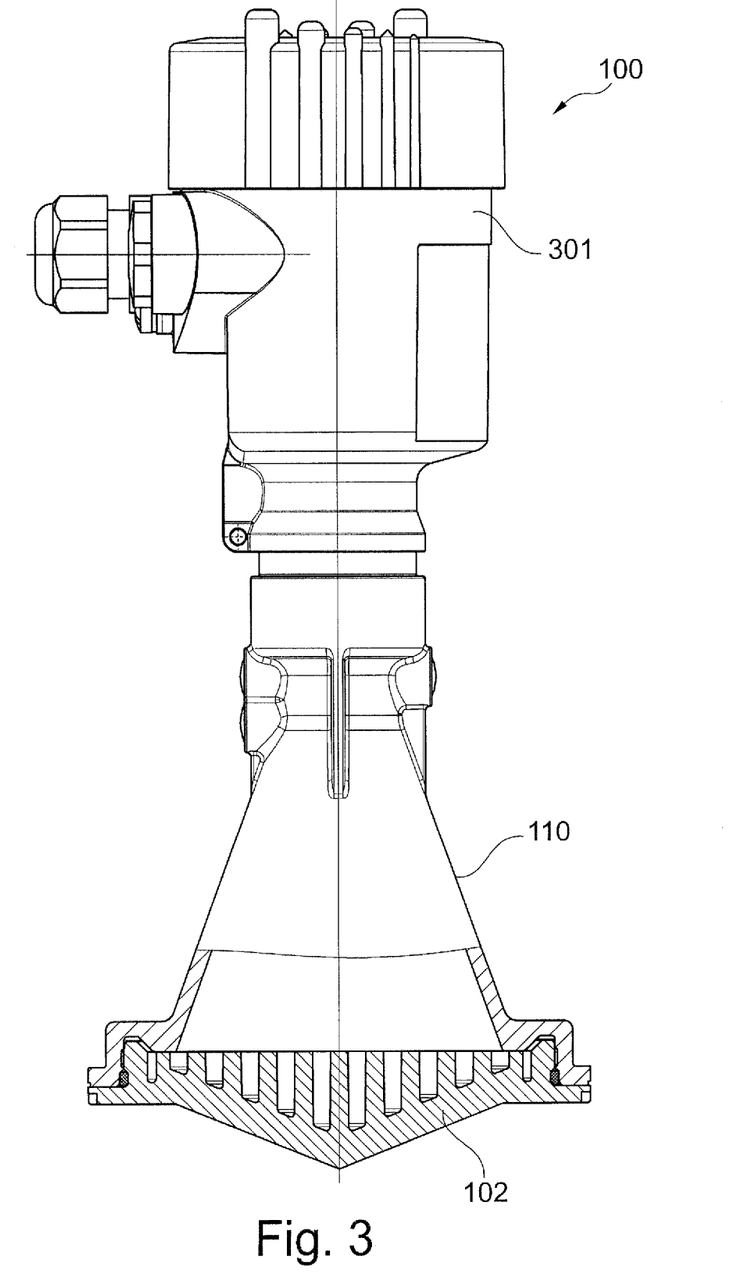
FIG. 3 shows a semi-cross-sectional view of the antenna of FIG. 1.

FIG. 3 shows the antenna of FIG. 1, wherein the lower section of the antenna which comprises the cover 102 is shown in a cross-sectional view. The upper part of the antenna comprises a housing 301.

Figure 4A:
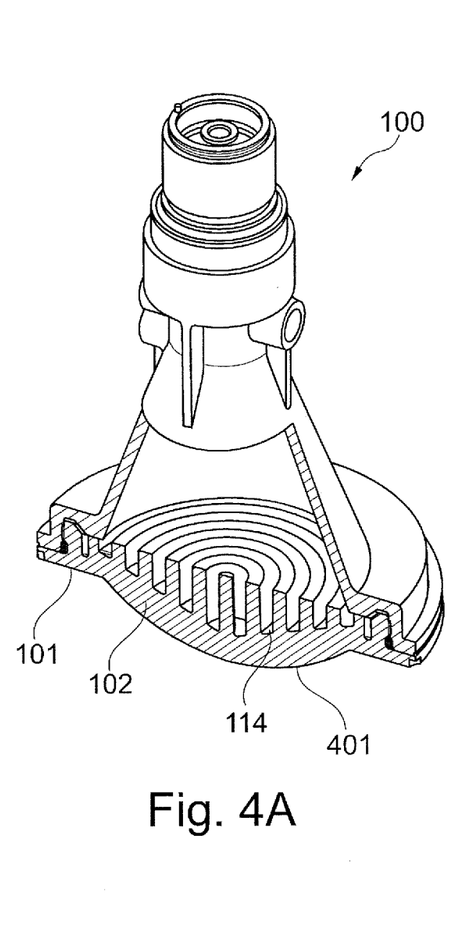
FIG. 4A shows a cross-sectional view of an antenna according to another exemplary embodiment of the present invention.
Figure 4B:
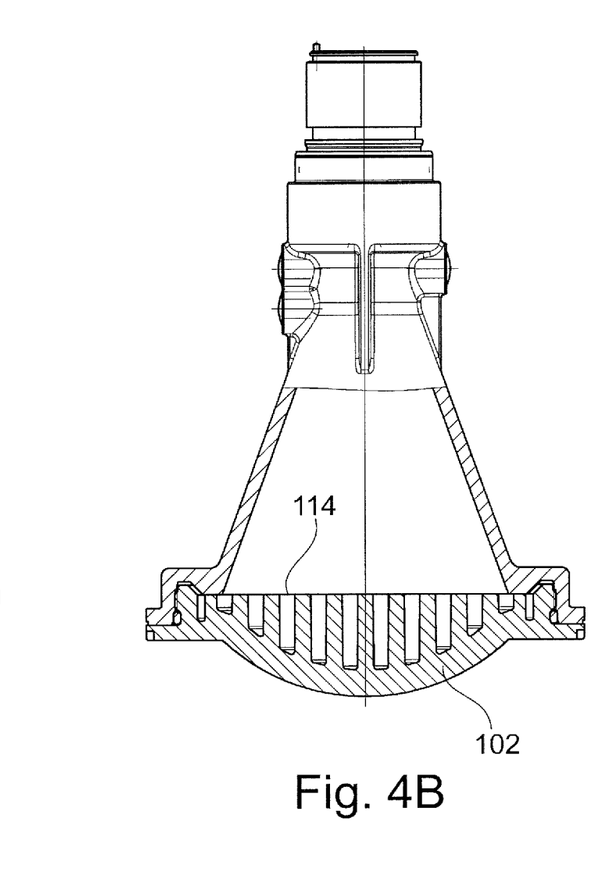
FIG. 4B shows another cross-sectional view of the antenna of FIG. 4A.

FIG. 4A shows a three-dimensional cross-sectional view of an antenna 100 with a cover 101 according to another exemplary embodiment of the present invention.

The outer surface 401 of the base body 102 is concave and the inner surface 114 of the base body is parallel to concave outer surface 401.

In contrast to the embodiment depicted in FIGS. 1 to 3 the lens-like cover 101 is not plane-convex, i.e. cone-shaped, but spherical with respect to its outer, lower surface 401.

The upper, inner surface 114 of the plurality of circular fins is planar (as it is in the embodiment depicted in FIGS. 1 to 3).

Figure 5A:
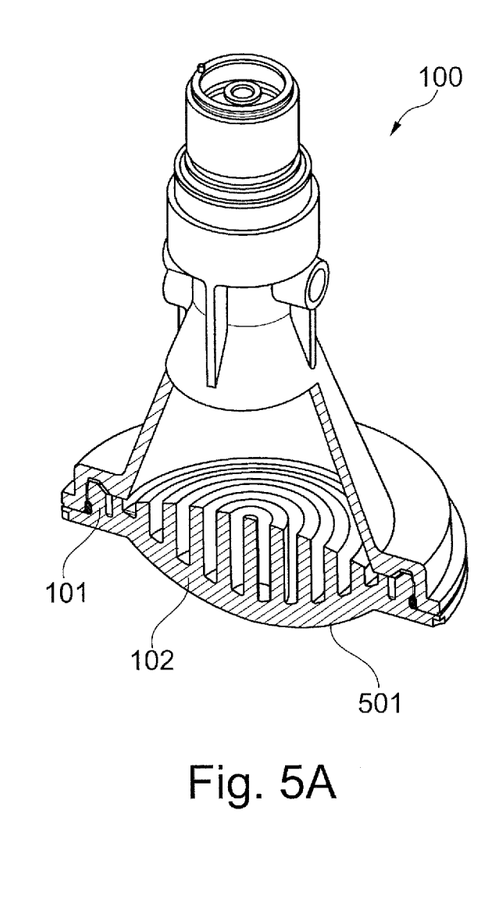
FIG. 5A shows a cross-sectional view of an antenna according to another exemplary embodiment of the present invention.
Figure 5B:
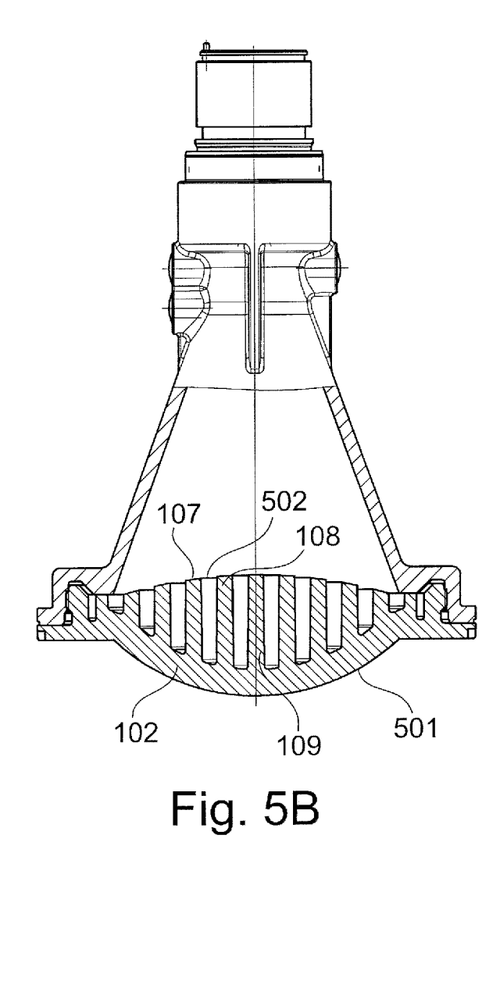
FIG. 5B shows another cross-sectional view of the antenna of FIG. 5A.

FIG. 5A shows a three-dimensional cross-sectional view of an antenna 100 according to another exemplary embodiment of the present invention, in which the antenna cover 101 has a base body 102 with a concave outer surface 501. Furthermore, as may be seen from FIG. 5B, the inner surface 502 of the plurality of circular fins is also concave and therefore, in contrast to the embodiments depicted in FIGS. 1 to 4, non-planar.

Consequently, the height of the circular fins 107, 108 (which are close to the centre of the cover at which the dome 109 is located) is bigger than the height of the corresponding fins 107, 108 of the embodiments depicted in FIGS. 1 to 4.

Figure 6:
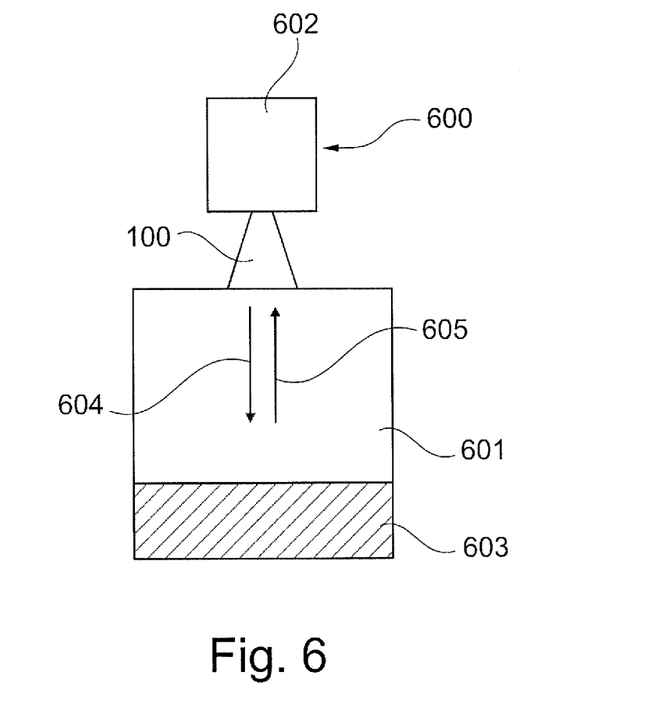
FIG. 6 shows a filling level measuring device according to an exemplary embodiment of the present invention.

FIG. 6 shows a filling level measuring device 600, for example a filling level radar, which comprises a housing 602, comprising the electronics, and the antenna 100, which is mounted to a container 601. The container 601 comprises the filling medium 603.

The antenna 100 is adapted for emitting a transmit signal 604 towards the filling medium 603 inside the container and for receiving a corresponding reflected signal 605 from the filling medium.

Figure 7:
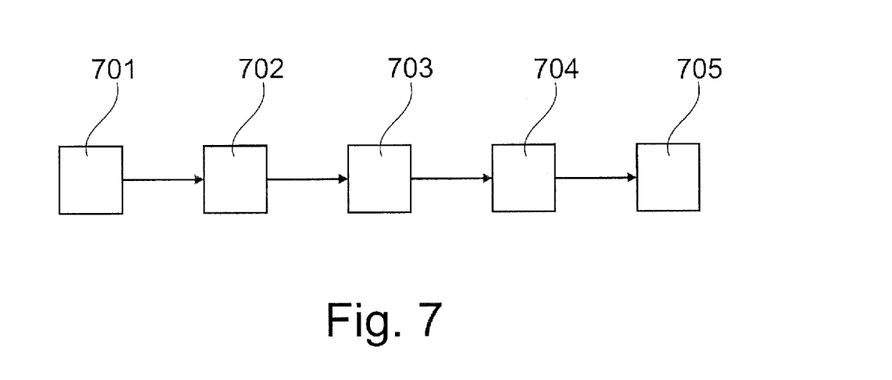
FIG. 7 shows a flow-chart of a method according to an exemplary embodiment of the present invention.

FIG. 7 shows a flow-chart of a method according to an exemplary embodiment of the invention. In step 701 a mould is provided and in step 702 a plastic material is injected into the mould, thus forming antenna cover with a base body and a plurality of circular fins concentrically arranged on the base body. In step 703 the mould is removed and in step 704 the cover is removed from the mould. Polishing of the cover after molding is not necessary if the mold has a polished surface.

In step 705 the cover is attached to an antenna horn of a filling level measuring device.

Thus, a focusing lens of a microwave antenna system of a filling level measuring device, such as a filling level radar, may be injection-moulded by injecting a dielectric material into a mould. The high frequency properties of the antenna cover may not be significantly different from the high frequency properties of a corresponding antenna cover which is produced by milling or lathing of a work piece, wherein the latter cover comprises varying thicknesses.

The cover may be polished while it is still attached to a part of the mould. By polishing the surfaces of the cover an adhesion of material to the cover may be reduced or even prevented. This may be in particular advantageous when the antenna is used in the area of food production.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A filling level measuring device antenna cover designed to cover a horn antenna of a filling level measuring device, comprising:
a base body;
a plurality of circular inner fins, each having the shape of a hollow cylinder, concentrically arranged on an inner surface of the base body, which inner surface faces towards an inside of the horn antenna when the cover covers the horn antenna; and
a central dome arranged on a symmetry axis of the inner fins,
wherein the inner fins and the base body consist of a plastic material injected at a top of the central dome,
wherein the inner fins and the dome have a common thickness,
wherein the thickness of each of the inner fins is one of less than and equal to 0.7 times a thickness of the base body, the plastic material used for molding the cover solidifies at every region of the plurality of circular fins substantially simultaneously.

2. The cover of claim 1, wherein the cover is adapted for focusing electromagnetic radiation emitted by the horn antenna.

3. The cover of claim 1, wherein the cover is adapted as a lens having at least one of a convex surface and a concave surface.

4. The cover of claim 1, wherein at least one of the inner fins has a constant thickness between two concentrically arranged opposite surfaces of the inner fin.

5. The cover of claim 1, wherein the base body has a constant thickness between two opposite surfaces of the base body.

6. The cover of claim 1, wherein two adjacent fins have the same thickness, the thickness of each of the two inner fins being the distance of the two concentrically arranged opposite surfaces of the respective inner fin; and wherein a distance between the two adjacent inner fins is equal to the thickness of each of the two adjacent inner fins.

7. The cover of claim 1, wherein the cover has a conical shape.

8. The cover of claim 1, wherein the base body and the plurality of circular inner fins are injection molded.

9. A horn antenna of a filling level measuring device, comprising
a filling level measuring device antenna cover including a base body and a plurality of circular inner fins, each having the shape of a hollow cylinder concentrically arranged on an inner surface of the base body, which inner surface faces towards an inside of the horn antenna when the cover covers the horn antenna, the filling level measuring device antenna cover including a central dome arranged on a symmetry axis of the inner fins;
wherein the inner fins and the base body consist of a plastic material injected at a top of the central dome,
wherein the inner fins and the dome have a common thickness,
wherein the thickness of each of the inner fins is one of less than and equal to 0.7 times a thickness of the base body, the plastic material used for molding the cover solidifies at every region of the plurality of circular fins substantially simultaneously.

10. A filling level measuring device, comprising:
a horn antenna including a filling level measuring device antenna cover, the cover including a base body and a plurality of circular inner fins, each having the shape of a hollow cylinder concentrically arranged on an inner surface of the base body, which inner surface faces towards an inside of the horn antenna when the cover covers the horn antenna, the cover including a central dome arranged on a symmetry axis of the inner fins;

wherein the inner fins and the base body consist of a plastic material injected at a top of the central dome, wherein the inner fins and the dome have a common thickness, wherein the thickness of each of the inner fins is one of less than and equal to 0.7 times a thickness of the base body, the plastic material used for molding the cover solidifies at every region of the plurality of circular fins substantially simultaneously.

11. The filling level measuring device of claim 10, wherein the device is adapted as a filling level radar.

12. A method for producing a filling level measuring device horn antenna cover for covering a horn antenna of a filling level measuring device, comprising the step of:

injection molding the cover, the cover including a base body and a plurality of circular inner fins, each having the shape of a hollow cylinder, concentrically arranged on an inner surface of the base body, which inner surface faces towards an inside of the horn antenna when the cover covers the horn antenna, the cover including a central dome arranged on a symmetry axis of the inner fins;

wherein the inner fins and the base body consisting of a plastic material injected at a top of the central dome, wherein the inner fins and the dome have a common thickness, wherein the thickness of each of the inner fins is one of less than and equal to 0.7 times a thickness of the base body, the plastic material used for molding the cover solidifies at every region of the plurality of circular fins substantially simultaneously.

* * * * *